United States Patent
Eckert et al.

(10) Patent No.: US 9,057,335 B2
(45) Date of Patent: Jun. 16, 2015

(54) METHOD FOR OPERATING AN EXHAUST GAS AFTERTREATMENT APPARATUS

(75) Inventors: Andreas Eckert, Renningen-Malmsheim (DE); Herbert Schoemig, Stuttgart (DE); Tobias Pfister, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1237 days.

(21) Appl. No.: 12/892,530

(22) Filed: Sep. 28, 2010

(65) Prior Publication Data

US 2011/0078998 A1 Apr. 7, 2011

(30) Foreign Application Priority Data

Oct. 6, 2009 (DE) .......................... 10 2009 045 377

(51) Int. Cl.
| | |
|---|---|
| *F01N 3/18* | (2006.01) |
| *F02D 41/02* | (2006.01) |
| *F01N 3/10* | (2006.01) |
| *F02D 41/14* | (2006.01) |
| *F02D 41/40* | (2006.01) |
| *F01N 13/00* | (2010.01) |
| *F01N 3/035* | (2006.01) |
| *F01N 3/20* | (2006.01) |

(52) U.S. Cl.
CPC ............. *F02D 41/0235* (2013.01); *F01N 3/035* (2013.01); *F01N 3/106* (2013.01); *F01N 3/2066* (2013.01); *F02D 41/0255* (2013.01); *F02D 41/1446* (2013.01); *F02D 41/405* (2013.01); *F02D 2200/0614* (2013.01); *Y02T 10/44* (2013.01); *F01N 13/009* (2014.06)

(58) Field of Classification Search
CPC ....... F01N 3/035; F01N 3/106; F01N 3/2066; F01N 13/009; F02D 41/0235; F02D 41/405; F02D 41/1446; F02D 2200/0614
USPC .............................. 60/285, 286, 295, 301, 303
See application file for complete search history.

(56) References Cited

U.S. PATENT DOCUMENTS

| | | | |
|---|---|---|---|
| 2005/0228572 A1 | 10/2005 | Mansbart | |
| 2005/0284131 A1 | 12/2005 | Forthmann et al. | |
| 2007/0110635 A1 | 5/2007 | Fritsch | |
| 2010/0050757 A1* | 3/2010 | Liu et al. | ........... 73/114.75 |

FOREIGN PATENT DOCUMENTS

| | | |
|---|---|---|
| DE | 102 58 278 | 6/2004 |
| DE | 10 2004 031 321 | 1/2006 |
| DE | 10 2005 054 579 | 5/2007 |

* cited by examiner

*Primary Examiner* — Kenneth Bomberg
*Assistant Examiner* — Jonathan Matthias
(74) *Attorney, Agent, or Firm* — Kenyon & Kenyon LLP

(57) ABSTRACT

The present invention relates to a method for operating an exhaust gas aftertreatment apparatus (13) of an internal combustion engine (11), which comprises an oxidation catalytic converter (29), an SCR catalytic converter (35) and a first temperature sensor (32) disposed in the direction of flow downstream of the oxidation catalytic converter (29) and upstream of the SCR catalytic converter (35), an exhaust gas atmosphere capable of exothermal reaction in said oxidation catalytic converter (29) being generated by the metering of hydrocarbons into the exhaust gas (3) upstream of said oxidation catalytic converter (29) during a heating operation. The method is thereby characterized in that a first numerical measurement value of a nominal value of a hydrocarbon conversion in said oxidation catalytic converter (29) is formed, in that a second numerical measurement value of an actual value of the hydrocarbon conversion in said oxidation catalytic converter (29) is determined as a function of the signals of the first temperature sensor (32), in that the second numerical measurement value is compared with the first numerical measurement value and in that the metering of the hydrocarbons is reduced if said second numerical measurement value is smaller than said first numerical measurement value. An independent claim relates to a control device set up for carrying out the method.

11 Claims, 2 Drawing Sheets

METHOD FOR OPERATING AN EXHAUST GAS AFTERTREATMENT APPARATUS

This application claims benefit of Serial No. 10 2009 045 377.6, filed 6 Oct. 2009 in Germany and which application is incorporated herein by reference. To the extent appropriate, a claim of priority is made to the above disclosed application.

BACKGROUND

The invention relates to a method for operating an exhaust gas aftertreatment device of an internal combustion engine according to the preamble of claim 1 as well as to an open-loop and/or closed-loop control device according to the preamble of claim 11.

Ever more stringent emission standards increasingly require the use of so-called SCR catalytic converters (selective catalytic reduction) for the reduction of nitrogen oxides in exhaust gas aftertreatment apparatuses. In the case of SCR catalytic converters, a reducing agent (e.g. a urea-water solution) is introduced when needed into the exhaust gas duct of an internal combustion engine in order to make the catalytic reduction of nitrogen oxides possible. In so doing, ammonia ($NH_3$) accrues, which reacts in the SCR catalytic converter with the environmentally harmful nitrogen oxides ($NO_x$) of the exhaust gas and converts these into non-toxic water ($H_2O$) and nitrogen ($N_2$).

The SCR catalytic converter, however, only begins to convert nitrogen oxides at a certain operating temperature (approximately 180-200 E). The internal combustion engines of motor vehicles are, however, frequently (colloquially "cold") started at a lower ambient temperature of approximately 20 EC. In order to bring the SCR catalytic converter as quickly as possible to its operating temperature, the practice of triggering active heating measures is known. In addition, heat is produced by measures taken inside the engine as well as by exothermal reactions of unburnt hydrocarbons in the oxidation catalytic converter, which bring about an accelerated heating of the entire exhaust gas duct and also thereby of the SCR catalytic converter. During the exothermal process, oxygen oxidizes hydrocarbon (e.g. $C_2H_6$) into harmless carbon dioxide ($CO_2$) and water ($H_2O$), and in doing so releases heat. The hydrocarbons reacting in the oxidation catalytic converter are introduced into the exhaust gas aftertreatment apparatus by a late afterinjection, which no longer combusts in the combustion chambers, or also directly into said exhaust gas aftertreatment apparatus.

These heating measures can be controlled purely in an open loop without feedback. An alternative solution is to implement the heating measures as a closed-loop control in order to achieve a certain temperature profile.

The German patent publication DE 102 58 278 A1 describes a method for modeling a catalytic temperature during an exothermal operation. The exothermal process is thereby triggered for regenerating the catalytic converter, respectively a particle filter. In the known method, a calculation of the temperature of the catalytic converter for the normal operation without exothermal influences as well as for the operation having a regeneration of the catalytic converter, which takes place exothermally, is carried out. The known method takes a temperature of the catalytic converter or the particle filter into account when controlling the internal combustion engine in connection with a regeneration of said catalytic converter or said particle filter. The objective is thereby to prevent the internal combustion engine from being operated with an excess amount of fuel, e.g. in the case of insufficient exhaust gas temperature, in order to trigger a regeneration. If on the contrary an allowed maximum value for the temperature of the exhaust gas is exceeded during a regeneration taking place exothermally, counter measures are introduced.

Methods similarly configured for operating an exhaust gas aftertreatment apparatus are described, for example, in the German patent publications DE 10 2004 031 321 A1 and DE 10 2005 054 579 A1.

Irrespective of the type of heating measures, the hydrocarbon conversion capacity of the oxidation catalytic converter is not taken into account by conventional applications. When the oxidation catalytic converter has a limited hydrocarbon conversion capacity, the hydrocarbons metered in for heating purposes cannot be completely converted by said oxidation catalytic converter, which then leads to a hydrocarbon slip. The unreacted hydrocarbons can also not be converted in the particle filter, which is usually disposed immediately downstream of the oxidation catalytic converter, due to the lower temperature of said particle filter. Said unreacted hydrocarbons consequently reach the SCR catalytic converter, which is usually disposed downstream of said oxidation catalytic converter and said particle filter. The hydrocarbons occupy storage locations there, which are needed for the storage of ammonia ($NH_3$), respectively nitrogen oxide ($NO_x$). The result of this effect, which is also denoted as hydrocarbon poisoning, is a reduction in the nitrogen oxide conversion and thereby an increase in the emission of nitrogen oxide.

It is also disadvantageous that the hydrocarbon poisoning can lead to misdiagnoses of the SCR catalytic converter. The term misdiagnosis is used in this case because said SCR catalytic converter is diagnosed to be defect due to the hydrocarbon poisoning although the situation relates to a reversible poisoning. During a regeneration of the particle filter, the hydrocarbon is expelled from said SCR catalytic converter. Said SCR catalytic converter is thereafter again fully functional. Permanent damage to said SCR catalytic converter is therefore not present. A diagnostic result, which judges said SCR catalytic converter to be defective, would therefore represent a misdiagnosis.

The hydrocarbons, which do not remain in the SCR catalytic converter and occupy storage locations there, leave the exhaust gas aftertreatment apparatus and also contribute to an increase in the hydrocarbon emissions in addition to the increase in the nitrogen oxide emissions.

SUMMARY

The present invention distinguishes itself from the technical field mentioned at the beginning of the application by virtue of the fact that a first numerical measurement value of a nominal value of a hydrocarbon conversion in the oxidation catalytic converter is formed and a second numerical measurement value of an actual value of the hydrocarbon conversion is determined as a function of the signals of the first temperature sensor. The second numerical measurement value is subsequently compared with the first numerical measurement value and the metering of the hydrocarbons is then reduced if said second numerical measurement value is smaller than said first numerical measurement value.

The idea underlying the invention is to assess the hydrocarbon conversion capacity of the oxidation catalytic converter during a heating process and if need be to reduce the metering of hydrocarbon into the exhaust gas in order to minimize a hydrocarbon slip and thereby protect the SCR catalytic converter from a hydrocarbon poisoning.

In so doing, the hydrocarbon conversion capacity is effectively assessed in one embodiment by forming a heat balance.

For this purpose, heat quantities relating to the oxidation catalytic converter are associated in each case with the numerical measurement values of the nominal and actual value and are subsequently compared. Another embodiment provides for the heat balance to be formed on the basis of nominal and actual temperatures. Corrective counter measures are then taken in answer to an insufficient hydrocarbon conversion capacity. The SCR catalytic converter is protected from hydrocarbon poisoning by the method. Moreover, possible misdiagnoses when monitoring said SCR catalytic converter are avoided by using said method. At the same time, the hydrocarbon emissions are reduced.

It is furthermore advantageous for a nominal value of an exothermally producible quantity of heat to be used as the first numerical measurement value, said quantity of heat being determined with a first mathematical model as a function of a calculated value of the hydrocarbon mass flow flowing into the oxidation catalytic converter. Said hydrocarbon mass flow is produced by post-injected fuel into combustion chambers of the internal combustion engine (so-called afterinjections).

By the term post-injected fuel, an injection of fuel is thereby understood occurring later than a main injection, which determines the engine torque to be generated, to such an extent that the post-injected fuel is no longer burnt in the combustion chambers and is thereby discharged in an unburnt state.

In contrast thereto, there are also afterinjections, the fuel of which is still burnt in the combustion chambers. The combustion, however, largely takes place torque neutrally in this instance. Afterinjections of this kind are not involved here.

In a further embodiment, the hydrocarbon mass flow could also be generated by injections being made directly into the exhaust gas duct.

The injection quantity of the afterinjection is thereby known in each case in an open-loop and/or closed-loop control device for the open-loop and closed-loop control of the internal combustion engine. Furthermore, a producible quantity of heat of a standardized injection volume is deposited in the open-loop and/or closed-loop control device. It is thereby possible to calculate the exothermally producible quantity of heat in the oxidation catalytic converter by the use of the said first numerical measurement value.

A precondition for the calculation is that the nominal value of the quantity of heat produced exothermally is determined under the premise of a predetermined conversion capacity of an oxidation catalytic converter. This can be tailored to suit an idealized oxidation catalytic converter or a realistic, recently manufactured oxidation catalytic converter with an appropriate degree of efficiency.

Furthermore, the nominal value of the quantity of heat produced exothermally can additionally be determined as a function of a temperature of the oxidation catalytic converter. In so doing, the temperature of the oxidation catalytic converter can be ascertained as a function of a signal of a second temperature sensor disposed upstream of said oxidation catalytic converter.

In another embodiment, it is also possible for the temperature of the oxidation catalytic converter to be ascertained by a temperature sensor, which measures the exterior temperature of said oxidation catalytic converter.

It can be determined by ascertaining the temperature of the oxidation catalytic converter, respectively the temperature of the exhaust gas in said oxidation catalytic converter, if the inventive method has to be triggered to heat up the exhaust gas duct. This is necessary when cold starting the engine or also then, for example, if while driving the exhaust gas duct including said oxidation catalytic converter and the SCR catalytic converter has cooled down below a critical temperature so that a proper functioning of said SCR catalytic converter is no longer ensured. In these instances, the exothermal process can be triggered.

Furthermore, a possible overheating of the oxidation catalytic converter during the exothermal process can be recognized by ascertaining the temperature of said oxidation catalytic converter, and consequently corresponding counter measures are initiated in the open-loop and/or closed-loop control device.

In addition, it is advantageous for an actual value of a quantity of heat produced exothermally to be used as the second numerical measurement value. In so doing, the actual value of the quantity of heat produced exothermally is formed as a function of the signal of the first temperature sensor disposed downstream of the oxidation catalytic converter and as a function of an expected value for the temperature downstream of said oxidation catalytic converter, which is calculated from a second mathematical model while not taking exothermal influences into account. That means an actual quantity of heat in said oxidation catalytic converter is initially calculated from the temperature ascertained downstream of said oxidation catalytic converter, from a mass ascertained for the air that has been drawn into the intake manifold, from the fuel injected into the combustion chambers and from a value of a heat capacity deposited in the open-loop and or closed-loop control device.

The second mathematical model subsequently takes a loss in the quantity of heat into account, which, for example, occurs as a result of heat lost on the exterior walls of the oxidation catalytic converter. In addition, the second mathematical model takes into account a dependence of the signal of the second temperature sensor disposed upstream of said oxidation catalytic converter when ascertaining the expected value for the temperature downstream of said oxidation catalytic converter. That means the temperature of the exhaust gas flowing into said oxidation catalytic converter is also taken into account when calculating the second numerical measurement value as the actual quantity of heat.

By comparing the first numerical measurement value with the second numerical value, which indicate the nominal and actual quantity of heat, a heat balance can be formed, from which conclusions can be drawn about the effect of the exothermal process and hence about the state of the oxidation catalytic converter. If the expected quantity of heat is not achieved, that means that hydrocarbon was not completely converted in the oxidation catalytic converter. A counter measure is the reduction of the afterinjection quantity into the combustion chamber of the internal combustion engine.

In addition, the fact that a regeneration of the oxidation catalytic converter has to be initiated or that said oxidation catalytic converter has to be replaced on account of an ongoing malfunction can thus be recognized by an evaluation of protocols of previous afterinjections. The reduction of the afterinjection quantity can also be canceled in order to check whether the rate of conversion is still low.

It is furthermore advantageous for the metering of hydrocarbons into the exhaust gas to result from afterinjections of fuel into at least one combustion chamber of the internal combustion engine. Afterwards the unburnt hydrocarbon (fuel) is discharged into the exhaust gas duct in order that the exothermal reaction may proceed in the oxidation catalytic converter; thus enabling the exhaust gas duct to heat up as required. That means that no additional means are needed to heat up said exhaust gas duct.

The quantity of hydrocarbon to be metered with afterinjections is controlled or regulated by the open-loop and/or closed-loop control device and can be directly decreased or increased depending upon the result of the inventive evaluation of the heat balance. This reduces the hydrocarbon emissions, which result from the incomplete conversion in the exhaust gas duct, and reduces the fuel consumption by avoiding unworkable afterinjections.

Should the open-loop, respectively closed-loop, control of the afterinjections not be successful, a measure, which reduces the thermodynamic efficiency of the internal combustion engine, can alternatively or additionally be triggered to raise the exhaust gas temperature of said internal combustion engine. In the case of this alternative heating strategy, the efficiency of said internal combustion engine is, for example, temporarily reduced by means of an "unfavorable" injection of fuel into the combustion chamber. According to thermodynamic laws, the exhaust gas temperature then necessarily increases. This is utilized to rapidly heat up the exhaust gas duct.

Further advantages result from the description and the accompanying figures.

It goes without saying that the features previously mentioned and those to be subsequently described can be used not only in the combination stated in each case but also in other combinations or strictly by themselves without departing from the scope of the present invention.

BRIEF DESCRIPTION OF THE DRAWINGS

Exemplary embodiments of the invention are depicted in the figures and are described in detail in the description below. The following are shown, in each case in schematic form.

DETAILED DESCRIPTION

Figure 1:
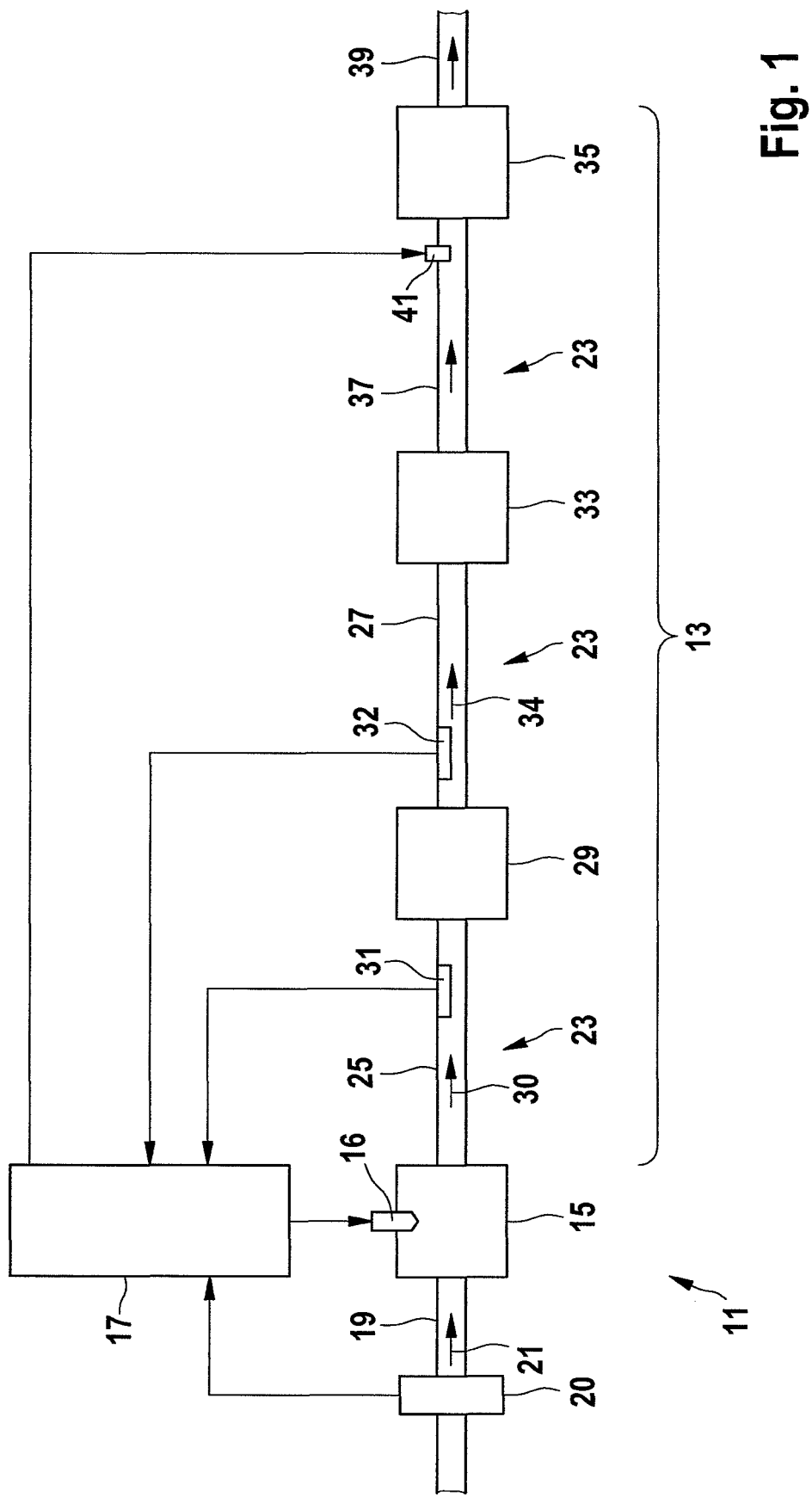
FIG. 1 is a schematic depiction of an internal combustion engine having an exhaust gas aftertreatment device.
Figure 2:
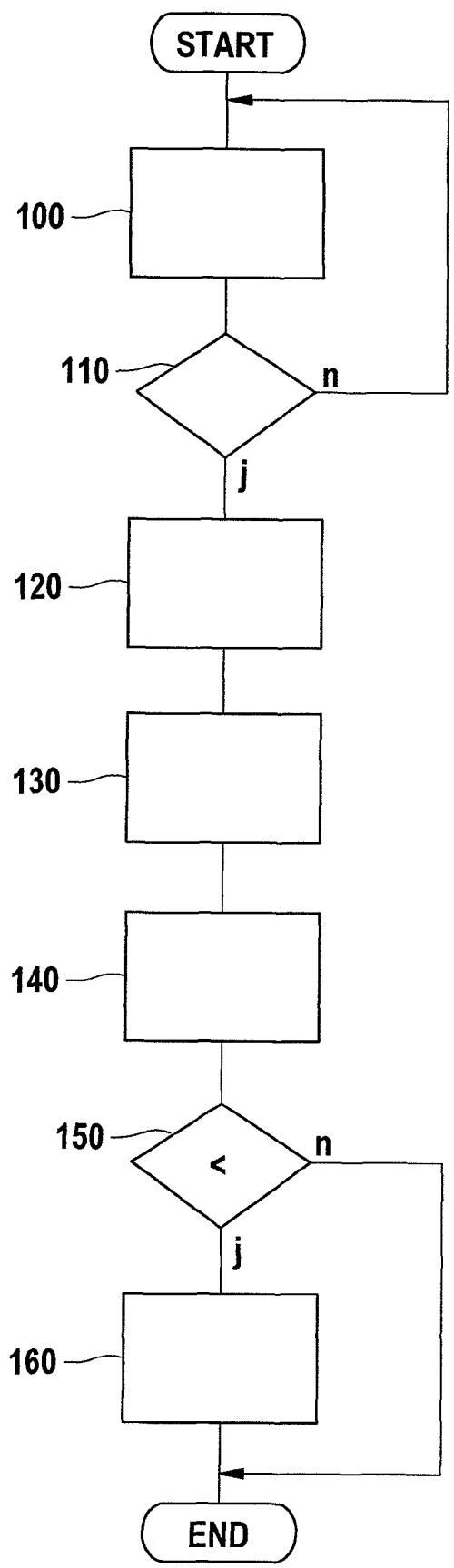
FIG. 2 is a flow diagram of the method according to the invention.

FIG. 1 shows an internal combustion engine 11 having an exhaust gas aftertreatment apparatus 13 in a motor vehicle. The internal combustion engine 11 comprises an engine block 15 having injection valves 16 for fuel, which are connected to a control device 17 of said internal combustion engine 11, which is configured as an open-loop and/or closed-loop control device. Air (arrow 21) is drawn into the combustion chambers (not shown) of said internal combustion engine 11 via an intake manifold 19. An air mass flow sensor 20, which sends signals to the control unit 17, is disposed in the intake manifold 19. Said intake manifold 19 can alternatively or additionally have additional sensors for acquiring different state variables of the air 21, as, for example, an air temperature and/or an air pressure. In addition, a throttling device can be provided in said intake manifold 19 as an air quantity actuator for manipulating the air mass flow. An exhaust gas recirculation valve, a manifold pressure valve or an actuator for adjusting the geometry of an exhaust gas turbocharger can alternatively or additionally be used as an air quantity actuator. Furthermore, a compressor of the air supply system for compressing the air 21 supplied to the engine block 15 can be disposed in said intake manifold 19. In so doing, the compressor can constitute a part of an exhaust gas turbo charger.

The internal combustion engine 11 furthermore comprises an exhaust gas duct 23, which receives the exhaust gases of said internal combustion engine 11. An oxidation catalytic converter 29 is disposed between a first section 25 and a second section 27 of the exhaust gas duct 23. An outlet of the oxidation catalytic converter 29 is connected to an inlet of a particle filter 33 via the second section 27 of said exhaust gas duct 23. The exhaust gas flowing out of the oxidation filter 29 is labeled with the reference numeral 34. A first temperature sensor 32 is disposed in the direction of flow downstream of said oxidation catalytic converter 29 and a second temperature sensor 31 is disposed in the direction of flow upstream of said oxidation catalytic converter 29. The two temperature sensors 31 and 32 send signals to the control device 17. In addition, the exhaust gas aftertreatment apparatus 13 includes an SCR catalytic converter 35 (SCR=selective catalytic reduction). An SCR catalytic converter promotes a selective catalytic reduction, which reduces nitrogen oxides in the exhaust gas. The SCR catalytic converter 35 is connected on one side to an outlet of the particle filter 33 via a third section 37 of said exhaust gas duct 23. The outlet of said SCR catalytic converter 35 opens out into a fourth section 39 of said exhaust gas duct 23. A metering device 41, which can be controlled by said control device 17, projects into the third section 37 of said exhaust gas duct 23 for the purpose of introducing a reducing agent from a separate container (not specified). An actuator of the metering valve 41 is connected to the outlet of said control device 17.

The SCR catalytic converter 35, however, only then converts sufficient amounts of nitrogen oxides at a certain operating temperature (approximately 180-200 EC). In order, for example, after cold start-ups to achieve a conversion of nitrogen oxides necessary to meet an emission limit, said SCR catalytic converter 35 has to reach its operating temperature as quickly as possible. This is often only possible with an active heating measure. For this purpose, heat, which ensures a rapid heating of the entire exhaust gas duct 23 and thereby also of the SCR catalytic converter 35, is generated by measures taken within the engine as well as by the reaction of unburnt hydrocarbons (fuel) in the oxidation catalytic converter 29 due to a so-called exothermal process. The hydrocarbons reacting in said oxidation catalytic converter 29 are introduced via a late, non-burning afterinjection into the combustion chamber of the internal combustion engine 11 or also externally into the first section 25 of said exhaust gas duct 23.

FIG. 3 shows the sequence of the inventive procedural aspects of an exemplary embodiment. Starting from a normal operation of the internal combustion engine 11 taking place in step 100, the control unit 17 checks in the query 10 whether the temperature in the exhaust gas duct 23 lies below a predefined, critical temperature. This is the case when cold starting the engine but can however also occur while driving the motor vehicle and can, for example, be ascertained via signals of the first temperature sensor 32 disposed in the direction of flow downstream of the oxidation catalytic converter 29.

The control device 17 is incidentally set up, particularly programmed, to control the sequence of the method presented in this application or one of its embodiments in an open, respectively closed, loop.

If the temperature lies below the critical temperature, an afterinjection of fuel into at least one combustion chamber of the internal combustion engine 11 is triggered in step 120 of the method. During the exhaust stroke, the late injected fuel travels with the burnt exhaust gas 30 into the exhaust gas duct 23.

Using the hydrocarbon mass flow known in the control device and a mathematical model, which illustrates the influence of the oxidation catalytic converter 29 when working in accordance with the model, a calculation is subsequently made in step 130 of the method as to what quantity of heat can be released in said oxidation catalytic converter 29 by the exothermal process taking place there. When calculating the quantity of heat, a temperature of the hydrocarbon mass flow upstream of said oxidation catalytic converter 29 is taken into account. The temperature is ascertained via signals of the second temperature sensor 31 disposed upstream of said oxidation catalytic converter 29. This allows for a nominal numerical measurement value for an achievable quantity of heat in said oxidation catalytic converter 29 to be known.

In the next step 140 of the method, an actual numerical measurement value of a quantity of heat in the oxidation catalytic converter 29 is calculated from a temperature of the exhaust gas 34 ascertained downstream of said oxidation catalytic converter 29. The temperature is ascertained via signals of the first temperature sensor 32 disposed downstream of said oxidation catalytic converter 29. Besides the temperature, a mass of the air previously drawn into the intake manifold 19 and of the fuel injected into the combustion chambers as well as a heat capacity deposited in the control device 17 is necessary for calculating the quantity of heat in said oxidation catalytic converter 29. The intake air is thereby acquired by the air mass flow sensor 20 disposed in said intake manifold 19. The injected fuel quantity is already known in the control device 17. The quantity of heat in said oxidation catalytic converter 29 is calculated as a function of the values which have been ascertained. In addition, when calculating the actual quantity of heat, a loss of said quantity of heat, for example, as a result of heat lost on the exterior walls of said oxidation catalytic converter 29 is taken into account. At the same time, the temperature upstream of said oxidation catalytic converter 29 is also taken into account by evaluating the signal of the second temperature sensor disposed upstream of said oxidation catalytic converter 29.

The nominal numerical measurement value which was ascertained is compared with the actual numerical measurement value which was ascertained in the query 150, i.e. a heat balance is carried out. If said actual numerical measurement value is less than said nominal measurement value, that means that the entire hydrocarbon was not converted in the exothermal process in the oxidation catalytic converter 29 and therefore hydrocarbon is led further to the SCR catalytic converter 35. A conversion rate which is too small is therefore determined at said oxidation catalytic converter 29. Step 160 reacts thereupon with a reduction of the quantity of the late afterinjection. The method can also additionally switch to an alternative strategy with a greater weighting of the measures taken within the engine. In so doing, a measure, which reduces the thermodynamic efficiency of the internal combustion engine, can be triggered to increase the temperature of the exhaust gas 30. When employing this measure, the efficiency of the internal combustion engine is temporarily reduced; thus enabling the exhaust gas temperature to increase.

The invention claimed is:

1. A device comprising:
an injection valve; and
a control unit operably connected to control the injection valve, the control unit being programmed to operate an exhaust gas aftertreament apparatus of an internal combustion engine, the exhaust treatment apparatus having an oxidation catalytic converter, an SCR catalytic converter and a first temperature sensor disposed in the direction of flow downstream of the oxidation catalytic converter and upstream of the SCR catalytic converter,
being programmed to generate an exhaust gas atmosphere capable of exothermal reaction in said oxidation catalytic converter by using the injection valve to meter hydrocarbons into the exhaust gas upstream of said oxidation catalytic converter during a heating operation,
being programmed to form a first numerical measurement value of a nominal value of a hydrocarbon conversion in said oxidation catalytic converter,
being programmed to determine a second numerical measurement value of an actual value of the hydrocarbon conversion in said oxidation catalytic converter as a function of the signals of the first temperature sensor,
being programmed to compare the second numerical measurement value with the first numerical measurement value, and
being programmed to reduce the metering of the hydrocarbons from the injection valve if said second numerical measurement value is smaller than the first numerical measurement value.

2. Method for operating an exhaust gas aftertreatment apparatus of an internal combustion engine, the exhaust gas aftertreatment apparatus having an oxidation catalytic converter, an SCR catalytic converter and a first temperature sensor disposed in the direction of flow downstream of the oxidation catalytic converter and upstream of the SCR catalytic converter, the method comprising:
generating an exhaust gas atmosphere capable of exothermal reaction in said oxidation catalytic converter by using an injection valve to meter hydrocarbons into the exhaust gas upstream of said oxidation catalytic converter during a heating operation,
forming a first numerical measurement value of a nominal value of a hydrocarbon conversion in said oxidation catalytic converter,
determining a second numerical measurement value of an actual value of the hydrocarbon conversion in said oxidation catalytic converter as a function of the signals of the first temperature sensor,
comparing the second numerical measurement value with the first numerical measurement value and
reducing metering of the hydrocarbons from the injection valve if said second numerical measurement value is smaller than said first numerical measurement value.

3. The method according to claim 2, wherein a nominal value of an exothermally producible quantity of heat, which is determined as a function of a calculated value of the hydrocarbon mass flow flowing into the oxidation catalytic converter, is used as the first numerical measurement value.

4. The method according to claim 3, wherein the nominal value of the quantity of heat produced exothermally is determined under the premise that an oxidation catalytic converter has a predetermined conversion capacity.

5. The method according to claim 4, wherein the nominal value of the quantity of heat produced exothermally is additionally determined as a function of a temperature of the oxidation catalytic converter.

6. The method according to claim 5, wherein the temperature of the oxidation catalytic converter is ascertained as a function of a signal of a second temperature sensor disposed upstream of said oxidation catalytic converter.

7. The method according to claim 6, wherein an actual value of a quantity of heat produced exothermally is used as the second numerical measurement value.

8. The method according to claim 7, wherein the actual value of the quantity of heat produced exothermally is formed as a function of the signal of the first temperature sensor disposed downstream of the oxidation catalytic converter and of an expected value for the temperature downstream of said oxidation catalytic converter, which was ascertained from a second mathematical model while not taking exothermal influences into account.

9. The method according to claim 8, wherein the second mathematical model forms the expected value for the temperature downstream of the oxidation catalytic converter as a function of the signal of the second temperature sensor disposed upstream of said oxidation catalytic converter.

10. The method according to claim 2, wherein the metering of hydrocarbons into the exhaust gas takes place by means of afterinjections of fuel into at least one combustion chamber of the internal combustion engine.

11. The method according to claim 2, wherein in addition to reducing the metering of the hydrocarbons a measure, which reduces a thermodynamic efficiency of the internal combustion engine, is triggered to increase the exhaust gas temperature of said internal combustion engine.

\* \* \* \* \*